(12) United States Patent
Paul

(10) Patent No.: US 12,104,728 B1
(45) Date of Patent: Oct. 1, 2024

(54) PIVOTABLE HOSE CONNECTOR AND HYDRAULIC CYLINDER HAVING A PIVOTABLE HOSE SUITABLE FOR USE IN ASSOCIATION WITH CONVERTIBLE TOPS

(71) Applicant: Cabriolet Hydraulics, LLC, Sarasota, FL (US)

(72) Inventor: Zbigniew Robert Paul, University Park, FL (US)

(73) Assignee: CABRIOLET HYDRAULICS, LLC, Sarasota, FL (US)

( * ) Notice: Subject to any disclaimer, the term of this patent is extended or adjusted under 35 U.S.C. 154(b) by 0 days.

(21) Appl. No.: 18/522,137

(22) Filed: Nov. 28, 2023

(51) Int. Cl.
*F16L 33/22* (2006.01)
*F16L 33/207* (2006.01)

(52) U.S. Cl.
CPC ........... *F16L 33/223* (2013.01); *F16L 33/207* (2013.01); *F16L 33/2073* (2013.01); *F16L 33/224* (2013.01)

(58) Field of Classification Search
CPC . F16L 33/2073; F16L 33/207; F16L 33/2071; F16L 33/20; F16L 33/226; F16L 33/224; F16L 33/223; F16L 33/222
See application file for complete search history.

(56) References Cited

U.S. PATENT DOCUMENTS

| | | |
|---|---|---|
| 476,752 A | 6/1892 | Lenty |
| 919,444 A | 4/1909 | Loetzer |
| 927,388 A | 7/1909 | Watkins et al. |
| 1,006,671 A | 10/1911 | Myer |
| 1,098,294 A | 5/1914 | Patty |
| 1,844,023 A | 2/1932 | Terry |
| 1,934,022 A | 11/1933 | Wiggins |
| 2,319,024 A | 5/1943 | Wehringer |
| 2,328,013 A | 8/1943 | Hattan |
| 2,420,617 A | 5/1947 | Paquin |
| 2,446,599 A | 8/1948 | Knaggs |
| 2,513,115 A | 6/1950 | Sprigg |
| 2,560,565 A | 7/1951 | Freeman |
| 2,877,027 A | 3/1959 | Bagnell |
| 3,442,537 A | 5/1969 | Courtot |
| 3,843,169 A | 10/1974 | Wise |
| 3,918,679 A | 11/1975 | Baracchi |

(Continued)

FOREIGN PATENT DOCUMENTS

DE 202007010417 U1 12/2008

*Primary Examiner* — William S. Choi
(74) *Attorney, Agent, or Firm* — The Watson IP Group, PLC; Jovan N. Jovanovic

(57) ABSTRACT

A pivotable hose connector having a connector, an attachment assembly and a clamping nut. The connector housing has a crimp sleeve portion having a threaded outer surface and a lower housing cavity. The attachment assembly has a hose insertion member and a tubular coupling assembly. The hose insertion member has a hose barb and a central bore, and is positioned within the connector housing so that the crimp sleeve portion surrounds the hose barb. The body end is positioned within the lower housing cavity. The tubular coupling assembly is in rotative sealed engagement relative to each of the connector housing and the hose insertion member, and includes a tubular extension having an internal bore portion in fluid communication with the central bore. The clamping nut is threadedly engageable with the outer surface, and includes a bore extending therethrough that corresponds to the central bore.

21 Claims, 13 Drawing Sheets

(56) References Cited

U.S. PATENT DOCUMENTS

| | | | | |
|---|---|---|---|---|
| 3,973,791 A | * | 8/1976 | Porta | F16L 33/2073 |
| 4,114,930 A | | 9/1978 | Perkins | |
| 4,212,487 A | | 7/1980 | Jones | |
| 4,236,736 A | | 12/1980 | Anderson | |
| 4,278,279 A | | 7/1981 | Zimmerman | |
| 4,412,693 A | | 11/1983 | Campanini | |
| 4,437,689 A | | 3/1984 | Goebel | |
| 4,508,374 A | | 4/1985 | Kantor | |
| 4,635,972 A | | 1/1987 | Lyall | |
| 4,666,190 A | | 5/1987 | Yamabe | |
| 4,705,304 A | | 11/1987 | Matsuda | |
| 4,736,969 A | | 4/1988 | Fouts | |
| 4,805,942 A | | 2/1989 | Goodridge | |
| 5,149,145 A | | 9/1992 | Yokomatsu | |
| 5,178,423 A | | 1/1993 | Combeau | |
| 5,332,269 A | | 7/1994 | Homm | |
| 5,388,871 A | | 2/1995 | Saitoh | |
| 5,904,376 A | | 5/1999 | Yuen | |
| 5,931,510 A | * | 8/1999 | Mathew | |
| 6,193,239 B1 | | 2/2001 | Fukano | |
| 6,209,804 B1 | | 4/2001 | Spriegel | |
| 6,412,484 B1 | | 7/2002 | Izuchukwu | |
| 6,513,839 B2 | | 2/2003 | Nishio | |
| 6,517,123 B2 | | 2/2003 | Nishio | |
| 6,637,454 B1 | * | 10/2003 | Eley | F16L 33/2073 |
| 6,896,299 B1 | | 5/2005 | Nishio | |
| 6,991,266 B2 | | 1/2006 | Nishio | |
| 7,367,594 B2 | | 5/2008 | Evans | |
| 7,530,602 B2 | | 5/2009 | Fujii | |
| 7,648,178 B1 | | 1/2010 | Andros | |
| 7,744,018 B2 | | 6/2010 | Alexander | |
| 9,091,374 B2 | | 7/2015 | Sekino | |
| 9,194,517 B2 | | 11/2015 | Peirce | |
| 9,482,375 B2 | | 11/2016 | Paul | |
| 10,738,924 B1 | * | 8/2020 | Viggiano | F16L 33/207 |
| 2004/0012198 A1 | | 1/2004 | Brotzell | |
| 2007/0016166 A1 | | 1/2007 | Thistle | |
| 2007/0284461 A1 | | 12/2007 | Alexander | |
| 2008/0272590 A1 | | 11/2008 | Howard | |
| 2011/0215567 A1 | | 9/2011 | Hurwitz | |
| 2013/0257041 A1 | | 10/2013 | Peirce | |
| 2013/0307265 A1 | | 11/2013 | Sekino | |
| 2014/0138944 A1 | | 5/2014 | Kury | |
| 2014/0252760 A1 | | 9/2014 | Paul | |
| 2015/0167875 A1 | | 6/2015 | Huang | |
| 2015/0292661 A1 | | 10/2015 | Gilbreath | |
| 2016/0273693 A1 | | 9/2016 | Considine, Jr. | |
| 2021/0381629 A1 | | 12/2021 | Witte | |

\* cited by examiner

PIVOTABLE HOSE CONNECTOR AND HYDRAULIC CYLINDER HAVING A PIVOTABLE HOSE SUITABLE FOR USE IN ASSOCIATION WITH CONVERTIBLE TOPS

CROSS-REFERENCE TO RELATED APPLICATION

N/A

BACKGROUND OF THE DISCLOSURE

1. Field of the Disclosure

The disclosure relates in general to convertible top repair components, and more specifically to a pivotable hose connector and hydraulic cylinder suitable for use in association with, for example, a convertible top. While not expressly limited thereto, the disclosure is well suited to the repair of flexible hoses of the type used with hydraulic cylinders typically utilized in association with convertible tops in automobiles. Again, the disclosure is not limited to solely such a use.

2. Background Art

Hydraulic hoses are the means by which to convey hydraulic fluid in systems where a pump delivers pressurized fluid through a hose to a hydraulic actuator or cylinder. Such hydraulic actuators or cylinders are known in the art as a means for delivering linear or angular force to an object. The uses of such hydraulic actuators or cylinders is well known in the art of industrial robotics, construction equipment and automobiles.

For example, in the automotive arena, hydraulic systems are utilized to open and close convertible tops, trunks, hatches, hoods and doors, as well as with self-leveling suspension. Focusing on the automotive application for purposes of example solely, and not for purposes of limitation, hydraulic hoses in automotive applications are generally permanently attached to actuators. As such, the hoses are not readily removable and re-attachable to the respective actuators or cylinders. In fact, the hoses and the actuator are coupled to the pump only and removable as a unit, typically. While the actuator may be located in any location within the vehicle, the hydraulic pump (with fluid reservoir) is generally located in the trunk, or in a compartment forward, or proximate, the trunk. Among other examples of such configurations, the following vehicles utilize such a configuration: 2004 Mercedes-Benz model SL500, 1999 Mercedes-Benz model SLK 230, 2001 BMW model 325i and 2002 Ferrari model 360 Spyder. There are certainly others that are known to those of skill in the art.

In each of the foregoing, the cylinder/actuator with the permanently attached hoses can be very difficult to replace. For example, the actuator that is found at the front of a convertible top above the frame of a windshield includes hydraulic hoses that extend back into the trunk following a generally extremely convoluted path. The removal of the hoses may require the disassembly of interior panels and cutting away dozens of plastic straps from their hose attachment points. Such a removal and replacement may take on the order of ten or more man-hours.

In other instances, the original actuator itself may be fully operational, but a fitting or a joint may develop a leak at the actuator. Again, as the actuator is offered as a single unit, a full replacement is required.

There have been some solutions which allow for the replacement of the hydraulic cylinder with the splicing of some of the hydraulic hoses. Problems nevertheless can persist. In some instances the rigidity of the splices and the like preclude proper installation. In other instances, installation can lead to leaks of the components, and can be damaging to the hoses and/or the components.

SUMMARY OF THE DISCLOSURE

The disclosure is directed to a pivotable hose connector comprising a connector, an attachment assembly and a clamping nut. The connector housing has a crimp sleeve portion having a threaded outer surface and a lower housing cavity. An attachment assembly includes a hose insertion member and a tubular coupling assembly. The hose insertion member has a hose barb and a central bore extending therethrough. The hose insertion member is positioned within the connector housing so that the crimp sleeve portion surrounds the hose barb. The body end being positioned within the lower housing cavity. The tubular coupling assembly is in rotative sealed engagement relative to each of the connector housing and the hose insertion member. The tubular coupling assembly further including a tubular extension having an internal bore portion in fluid communication with the central bore. The clamping nut is threadedly engageable with the outer surface, and includes a bore extending therethrough that corresponds to the central bore.

In some configurations, the hose insertion member further includes a depending wall defining an inner cavity, the inner cavity in fluid communication with the central bore. The tubular coupling assembly further includes a hose insertion member coupling insertable into the inner cavity. A seal member extends between the inner cavity and the hose insertion member coupling.

In some configurations, the hose insertion member coupling further includes an annular channel. In some such configurations, the seal member comprises an O-ring insertable into the annular channel.

In some configurations, the hose insertion member is slidably movable relative to the inner cavity while maintaining sealed engagement.

In some configurations, the tubular coupling assembly further includes a connector housing coupling positioned between the hose insertion member and the tubular extension. A locking member engages the lower housing cavity of the connector housing and the connector housing coupling to preclude removal of the hose insertion member coupling from the lower housing cavity of the connector housing.

In some configurations, the locking member is disposed within a locking annular groove formed into the lower housing cavity, and the locking member comprises a circlip.

In some configurations, the lower locking surface is inwardly tapered.

In some configurations, the hose insertion member is in press fit engagement within the crimp sleeve of the connector housing.

In some configurations, the connector housing further includes an upper flange defined in the lower housing cavity. The hose insertion member further includes a flange. The upper flange abuts the flange when the hose insertion member is fully seated within the connector housing.

In some configurations, the connector housing coupling further includes an outer surface rotatably interfaceable with the lower housing cavity in a spaced apart configuration.

In some configurations, the outer surface interfaces with the lower housing cavity to preclude a side to side movement, while facilitating rotative movement.

In some configurations, the tubular coupling assembly remains in rotative sealed engagement through a full rotation of the tubular coupling assembly relative to each of the connector housing and the hose insertion member.

In some configurations, the clamping nut includes an outer surface that is structurally configured to receive a wrench. The connector housing includes an outer surface that is structurally configured to receive a second wrench. The clamping nut and the connector housing are configured so that the wrench and the second wrench can be the same.

In some configurations, the crimp sleeve and the hose barb are structurally configured to compress a hose therebetween, when the clamping nut is threadedly engaged with the threaded outer surface of the crimp sleeve.

In some configurations, the hose has an inner bore diameter of approximately 1.5 to 2.5 mm.

In some configurations, at least one pivotable hose connector of claim 1 coupled thereto.

In some configurations, the tubular coupling assembly is attached to the hydraulic cylinder.

In some configurations, the hydraulic cylinder has at least two pivotable hose connectors coupled thereto.

In another aspect of the disclosure, the disclosure is directed to a method of using the pivotable hose connector comprising the steps of: extending a hose between the hose barb and the clamp sleeve; tightening the clamping nut onto the connector housing; and rotating the tubular coupling assembly relative to the connector housing at least one of prior to or after the step of tightening the clamping nut.

In some configurations, the method further includes the step of coupling the pivotable hose connector to a hydraulic cylinder.

BRIEF DESCRIPTION OF THE DRAWINGS

The disclosure will now be described with reference to the drawings wherein.

DETAILED DESCRIPTION OF THE DISCLOSURE

Figure 1:
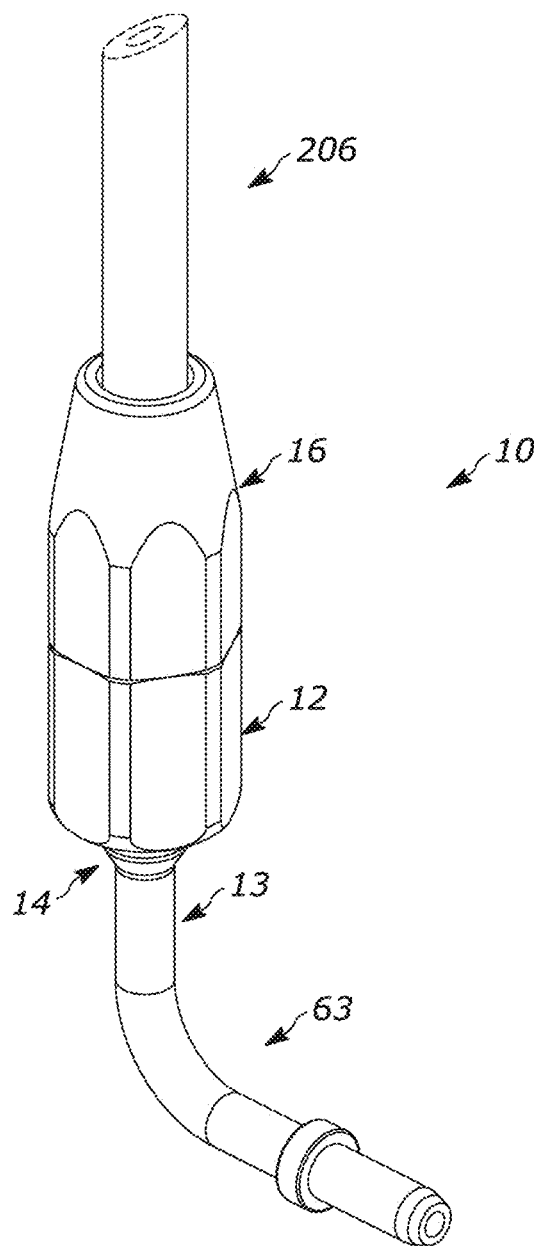
FIG. 1 of the drawings is a perspective view of the pivotable hose connector of the present disclosure.

While this disclosure is susceptible of configuration in many different forms, there is shown in the drawings and described herein in detail a specific configuration(s) with the understanding that the present disclosure is to be considered as an exemplification and is not intended to be limited to the configuration(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
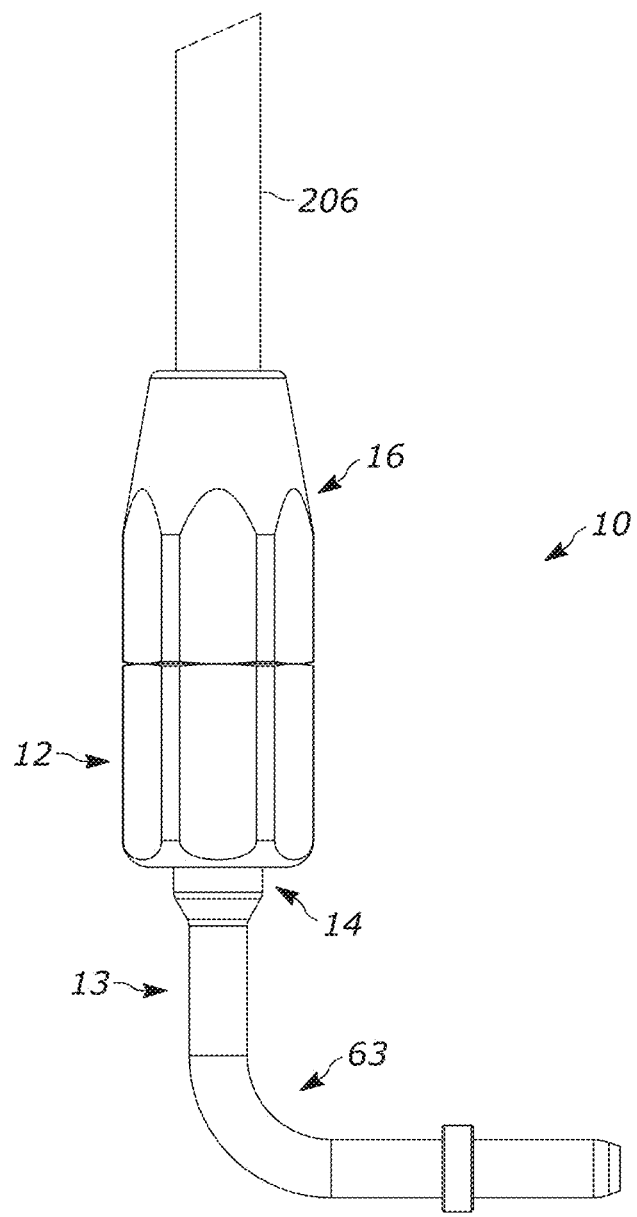
FIG. 2 of the drawings is a side elevational view of the pivotable hose connector of the present disclosure.

Referring now to the drawings and in particular to FIGS. 1 and 2, a pivotable hose connector assembly is shown generally at 10. The pivotable hose connector assembly 10, as will be described below, and which is shown in the drawings, is configured for use in association with hydraulic lines of the type that are utilized with automotive hydraulic cylinders that control and actuate the movement of a convertible top, for example, wherein the convertible hose connector assembly 10 is utilized to join to a hose end in sealed fluid communication. Typically, such hose is relatively high pressure and are generally quite stiff. Typically, although not required, the hoses are made of single or multiple annular layers of rubber, woven fabric, thermoplastic or other polymers. Generally, the hose has an inner bore diameter of approximately 1.5 to 2.5 mm (and most often a bore of 1.8 mm or 2.0 mm) with an outer diameter of approximately 3.5 to 5 mm. These are merely exemplary, and the disclosure is not limited to hoses of such dimensions.

The pivotable hose connector assembly 10 is shown in FIGS. 1-6 as comprising a connector housing 12, an attachment assembly 13, and a clamping nut 16. The attachment assembly 13 includes a hose insertion member 14, and a tubular coupling assembly 63 (with the understanding that a tubular coupling assembly includes a new pipe or the same pipe previously used with the cylinder which can be reutilized with the connector housing and clamping nut). As will be explained, the hose insertion member 14 is inserted into the connector housing 12, with the clamping nut 16 extending over a thread region 38 of the connector housing 12 to capture a hose in sealed engagement. While the disclosure is not limited to the use of any particular materials, the components of the hose connector assembly may comprise metal materials, such as aluminum, brass, steel or stainless steel, or alloys thereof. The disclosure is not limited to the use of any particular materials.

Figure 7:
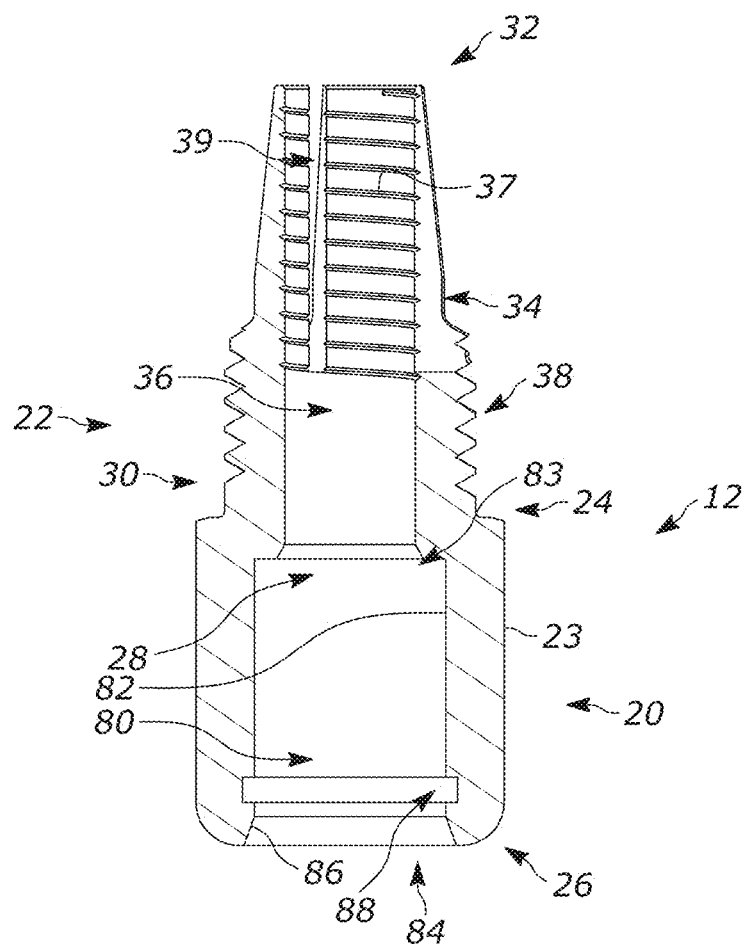
FIG. 7 of the drawings is a cross-sectional view of the connector housing of the pivotable hose connector of the present disclosure.

With further reference to FIG. 7, the connector housing 12 includes a first end body portion 20 and a crimp sleeve portion 22. The first end body portion 20 includes an outer surface 23, a first side 24, a second side 26 opposite the first side 24 and an internal bore portion 28. In at least one configuration, the outer surface 23 of the first end body portion 20 is hexagonal in shape such that a wrench (e.g., open end wrench) can be releasably coupled thereto. The internal bore portion 28 defines lower housing cavity 80. The lower housing cavity 80 (which is configured to receive the hose insertion member and the connector housing coupling) includes wall surface 82, upper flange 83 and lower opening 84. As will be explained, the wall surface 82 engages with the connector housing coupling 104 of the tubular coupling member 63 as well as with the second side region 52 of the body end of the hose insertion member. The upper flange 83 forms the interface between the internal bore portion 28 and the internal bore 36. The upper flange 83 limits the further insertion of the hose insertion member 14 into the connector housing 12, and further fixes the orientation of the hose barb 42 with the crimp sleeve portion 22. The lower opening 84 includes a chamfer 86 to facilitate the insertion of portions of the attachment assembly 13, and locking annular groove 88. As will be described below, the locking annular groove 88 is structurally configured to receive the locking member 122 therein, to, in turn, capture the hose insertion member and the tubular coupling assembly 63 within the connector housing.

The crimp sleeve portion 22 extends from the first side 24 of the first end body portion 20, and includes a proximal end 30, a distal end 32, an outer surface 34 and an internal bore 36. The proximal end 30 is at the first side of the first end body portion 20. The outer surface 34 comprises a generally cylindrical portion that includes the threaded region 38 near the proximal end 30. Beyond the threaded region (or as the threaded region ends, the outer surface 23 tapers inwardly to a conical configuration (which may have a smooth surface) toward the distal end 32 thereof. In some configurations, the threaded region may stop prior to the conical portion, or, may extend into the conical portion. In the configuration shown, the conical portion further includes a plurality of relief slots 39 extending therethrough to facilitate the inward movement of the conical portion against the hose positioned therewithin, upon engagement of and tightening of the clamping nut. In other configurations, more or less relief slots can be utilized on opposing sides of each other, i.e., preferably there is at least one relief slot.

The internal bore 36 comprises an opening of that is in fluid communication the internal bore portion 28. A plurality of surface patterns 37 are disposed along the internal bore 36, and especially along the portion which includes the at least one relief slot 39. In the configuration shown, the surface patterns 37 comprise a plurality of spaced apart teeth that extend in a direction that is perpendicular to the internal bore 36, so as to allow the surface patterns to bite into the outer surface of the hose 206.

It will be understood that the internal bore portion 28 of the first end body portion 20 and the internal bore 36 are collinear and generally, together, define the internal bore of the connector housing 12, and typically share a common central axis (i.e., preferably, concentric with each other). It is contemplated that connector housing 12 comprises a single monolithic member that is machined into the final configuration. Such a monolithic member has advantages from the standpoint of minimization of components and adds to the robustness of the design (i.e., minimizing leaks at joints and the like). In addition, such a configuration minimizes distortion of the hose (i.e., twisting and the like). Of course, multiple components could be utilized.

Figure 8:
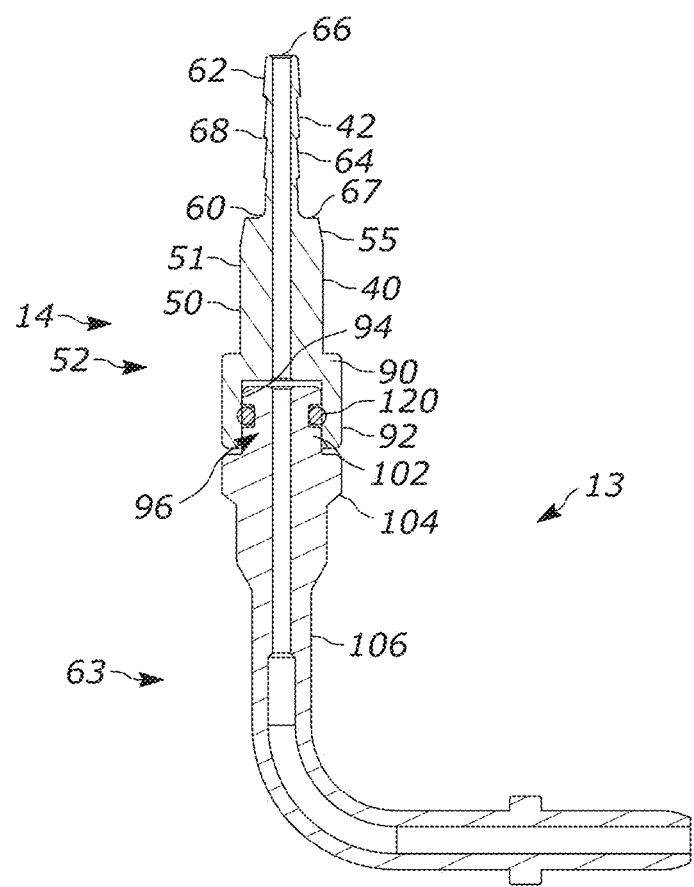
FIG. 8 of the drawings is a cross-sectional view of the hose insert member and the tubular coupling assembly of the present disclosure, in a coupled configuration with the seal member.
Figure 9:
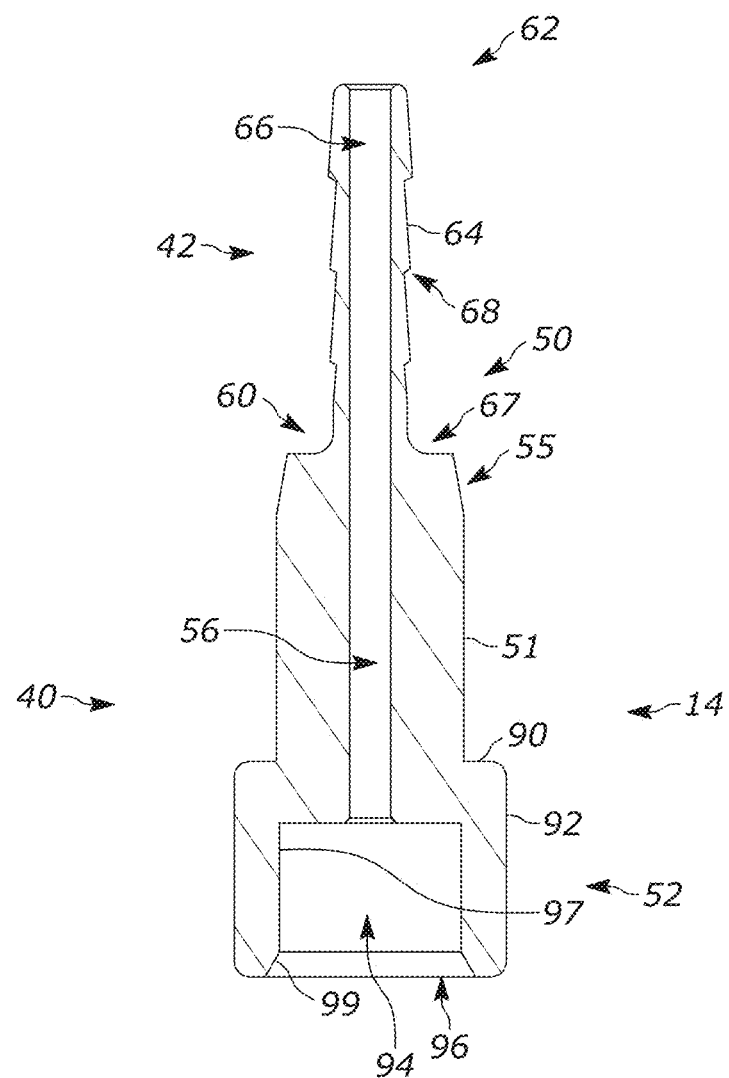
FIG. 9 of the drawings is a cross-sectional view of the hose insertion member of the pivotable hose connector of the present disclosure.
Figure 10:
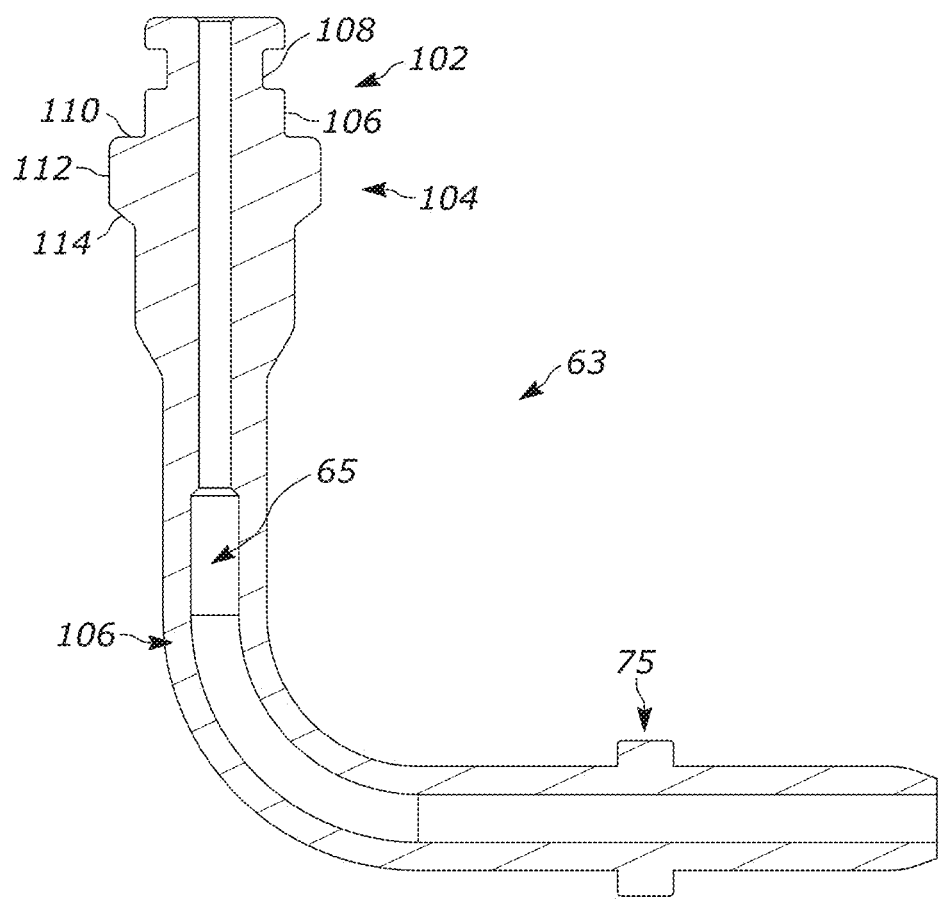
FIG. 10 of the drawings is a cross-sectional view of the tubular extension of the pivotable hose connector of the present disclosure.

With further reference to FIGS. 8-10, attachment assembly 13 comprises hose insertion member 14 and tubular coupling assembly 63, wherein the hose insertion member and the tubular coupling assembly are freely rotatable relative to each other when the pivotable hose connector is in the assembled configuration.

The hose insertion member 14 is shown as comprising an end body 40 and a hose barb 42. The end body 40 includes a first side region 50, a second side region 52, and a central bore 56. The first side region 50 is of a generally cylindrical configuration and includes a first side outer surface 51 that generally corresponds to the internal bore 36 the lower end of the crimp sleeve portion 22, such that the end body 40 can be press fit within the internal bore 36. In some configurations, it is contemplated that other manners of joining are contemplated, other than a press fit configuration. The first side region further includes a chamfer 55 proximate the upper end thereof, and terminates with flange 67.

The second side region 52 includes outward flange 90 proximate the interface with the first side region 50 and depending wall 92. The depending wall 92 defines inner cavity 94 and lower opening 96. The inner cavity 94 further includes seal surface 97. The lower opening 96 concludes with chamfer 99 which facilitates coupling and assembly of the tubular coupling assembly 63 therewith. The inner cavity 94 is in communication with the central bore 56 of the first side region 50 (and preferably concentric therewith).

The hose barb 42 comprises a generally cylindrical configuration that includes a proximal end 60, a distal end 62, an outer surface 64 and a central bore 66. The hose barb 42 extends from the first side region 50 of the end body 40 of the hose insertion member 14 (i.e., from the flange 67) and is generally coaxial therewith. The central bore 66 generally corresponds to the central bore 56 of the first end body portion 20 and the inner cavity 94. The outer surface 64 of the hose barb 42 includes a pattern 68, which in the configuration shown comprises a plurality of spaced apart ridges each of which encircles the outer surface 64. The edges of which may comprise barbs which tend to allow insertion of a hose (not shown), while providing additional resistance to removal thereof.

As set forth above, the interface of the hose barb 42 and the first side region 50 of the end body 40, defines flange 67. As will be explained, this flange 67 forms the physical stop for the hose that is inserted over the hose barb 42. As will be explained, when installed, the distal end 62 of the hose barb 42 matches the conical portion of the crimp sleeve portion 22.

The tubular coupling assembly 63 is sealingly interfaceable with the hose insertion member 14 and includes hose insertion member coupling 102, connector housing coupling 104 and tubular extension 106, with bore 65 extending therethrough. The hose insertion member coupling 102 includes outer surface 106, which includes annular channel 108 disposed therein. As will be explained below, the annular channel 108 is configured to receive and retain a seal member, such as seal member 120, which comprises an O-ring in the configuration shown. The seal member 120 provides a seal between the tubular coupling member 63 and the hose insertion member 14.

The connector housing coupling 104 includes upper flange 110, outer surface 112 and lower locking surface 114. In the configuration shown, the upper flange limits the insertion of the hose insertion member coupling 102 within the inner cavity 94 of the hose insertion member 14. The outer surface 112 provides engagement with the lower housing cavity 80 so as to limit side to side movement of the tubular coupling assembly 63 within the lower housing cavity 80 (while permitting rotational relative movement. The lower locking surface 114 is tapered inwardly opposite the upper flange 110. As will be explained, the lower locking surface 114 is configured to engage with the locking member 122 (the circlip).

The tubular extension 106 comprises an elongated tubular member that is configured to sealingly engage with a port of a hydraulic cylinder. The tubular extension 106 includes retention collar 75 which can interface, as will be explained below, with structures on the hydraulic cylinder, or couplings associated therewith. Depending on the configuration, the tubular extension 106 may be bent or may be straight. In the configuration shown, the tubular extension is bent at a 90° angle, whereas in other configurations, the angle may be greater or smaller. In still other configurations, the tubular extension may include multiple bends so as to have any number of different shapes and configurations. In the configuration shown, the tubular extension 106 is integrally formed with the connector housing coupling 104, whereas in other configurations, the two structures may be separate and coupled together through any number of different joining configurations so as to provide a sealed engagement.

Figure 3:
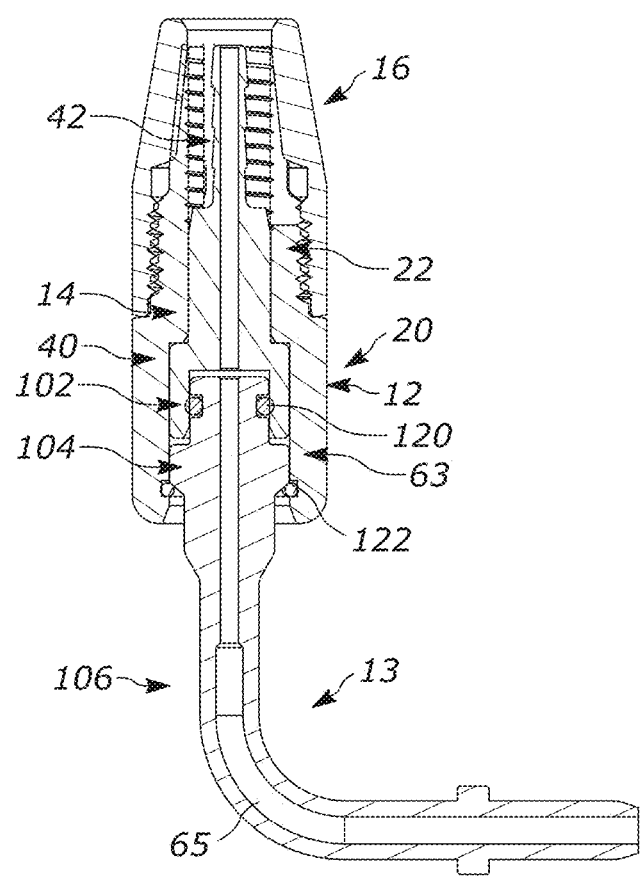
FIG. 3 of the drawings is a cross-sectional view of the pivotable hose connector of the present disclosure.
Figure 4:
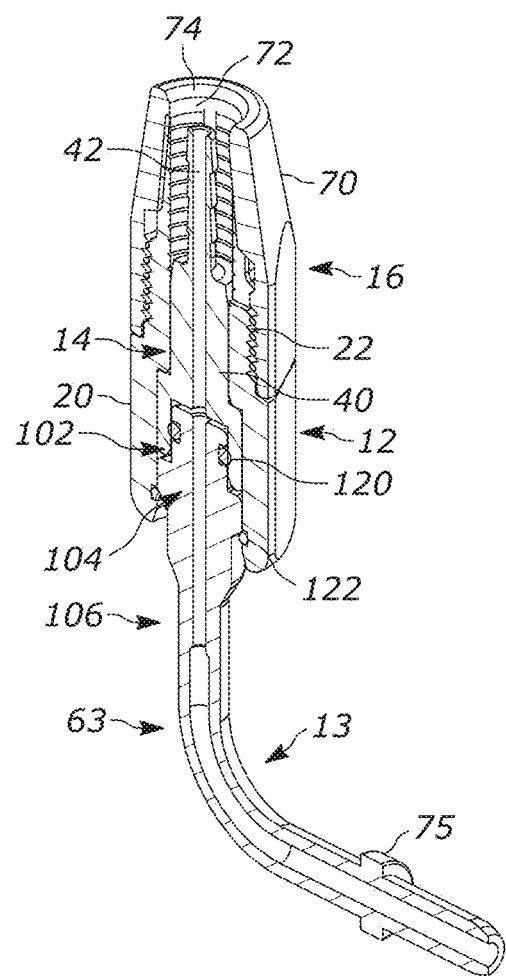
FIG. 4 of the drawings is a perspective cross-sectional view of the pivotable hose connector of the present disclosure.
Figure 11:
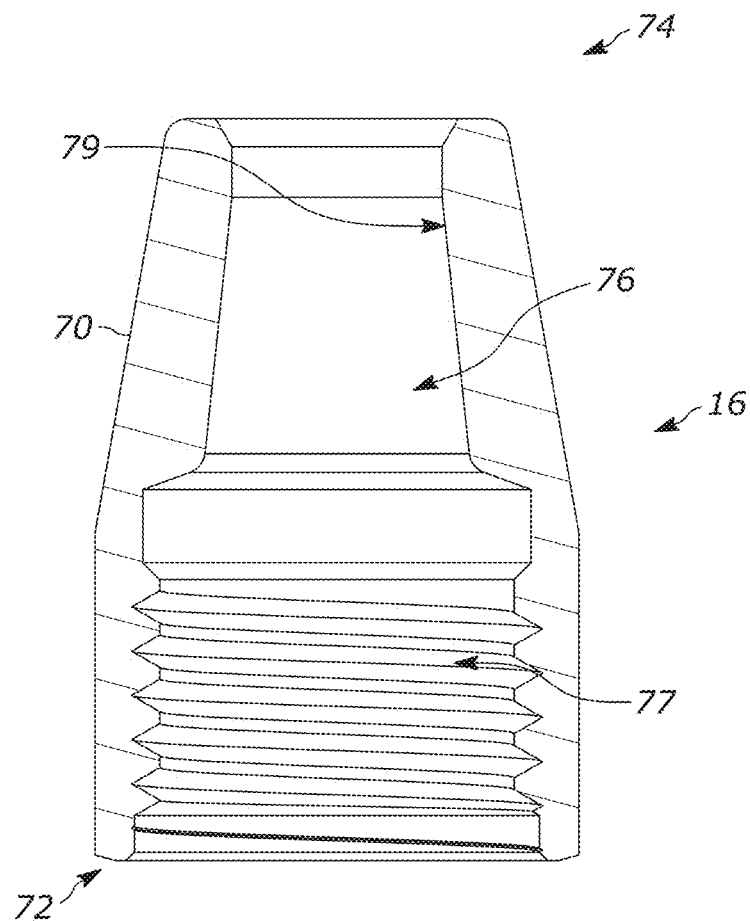
FIG. 11 of the drawings is a cross-sectional view of the clamping nut of the pivotable hose connector of the present disclosure.

With further reference to FIG. 11, the clamping nut 16 is shown in FIG. 3 as comprising an outer surface 70, an inner end 72, an outer end 74, and a bore 76. In at least one configuration, the outer surface 70 is hexagonal in shape such that a wrench (e.g., open end wrench) can be used to rotate the clamping nut 16 onto the crimp sleeve portion 22. Of course, other configurations are contemplated. The distal end of the outer surface 70 comprises an inwardly conical or tapered configuration. The bore 76 includes threaded portion 77 and a smooth bore portion 79. The threaded portion 77 is configured to matingly threadedly engage with the thread region 38 of the crimp sleeve portion 22. Preferably the outer surface of the clamping nut that is configured to be engaged with a wrench and the outer surface of the first end body portion of the connector housing 12 which is configured to be engaged with a wrench correspond to each other such that the wrench sizes used to engage each one of them is the same. Of course, in other configurations, it is contemplated that they me of different and non-corresponding configurations.

The smooth bore portion 79 generally comprises a diameter that is smaller than the threaded portion 77. The smooth bore portion 79 is configured to have a diameter such that, and as will be explained below, successive engagement of the threaded portion 77 with the threaded region 38 of the crimp sleeve portion 22 will direct the clamping nut 16 toward the first end body portion 20, and push the outer surface 34 that includes the relief slots 39 inwardly toward the respective hose barb 42, thereby crimping the hose positioned therebetween. In the configuration shown, the smooth bore portion 79 is tapered toward the distal end, although variations are contemplated. In addition, while the smooth bore portion 79 is shown to be smooth, in other configurations, a surface pattern or variation may be present thereon.

Figure 5:
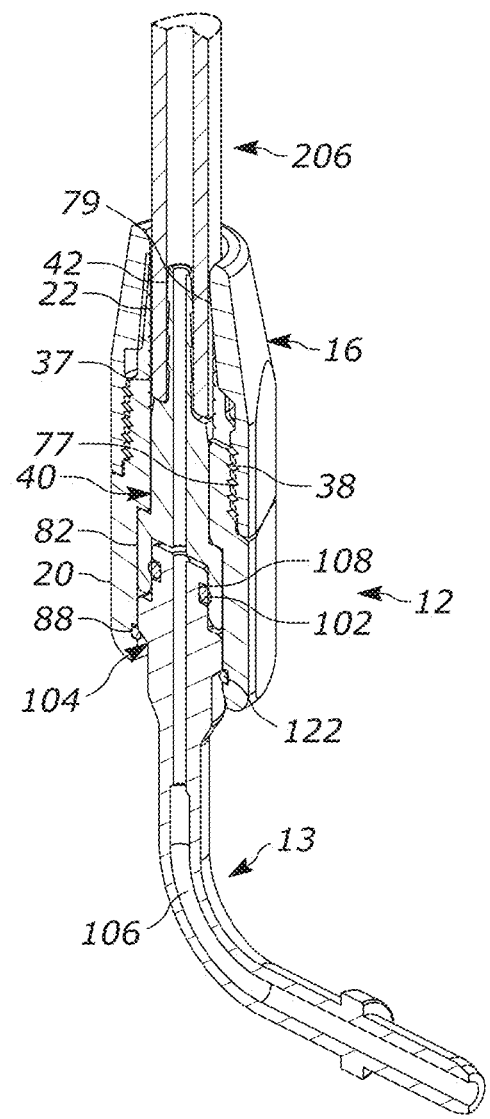
FIG. 5 of the drawings is a perspective cross-sectional view of the pivotable hose connector of the present disclosure, having a hose inserted therein.
Figure 6:
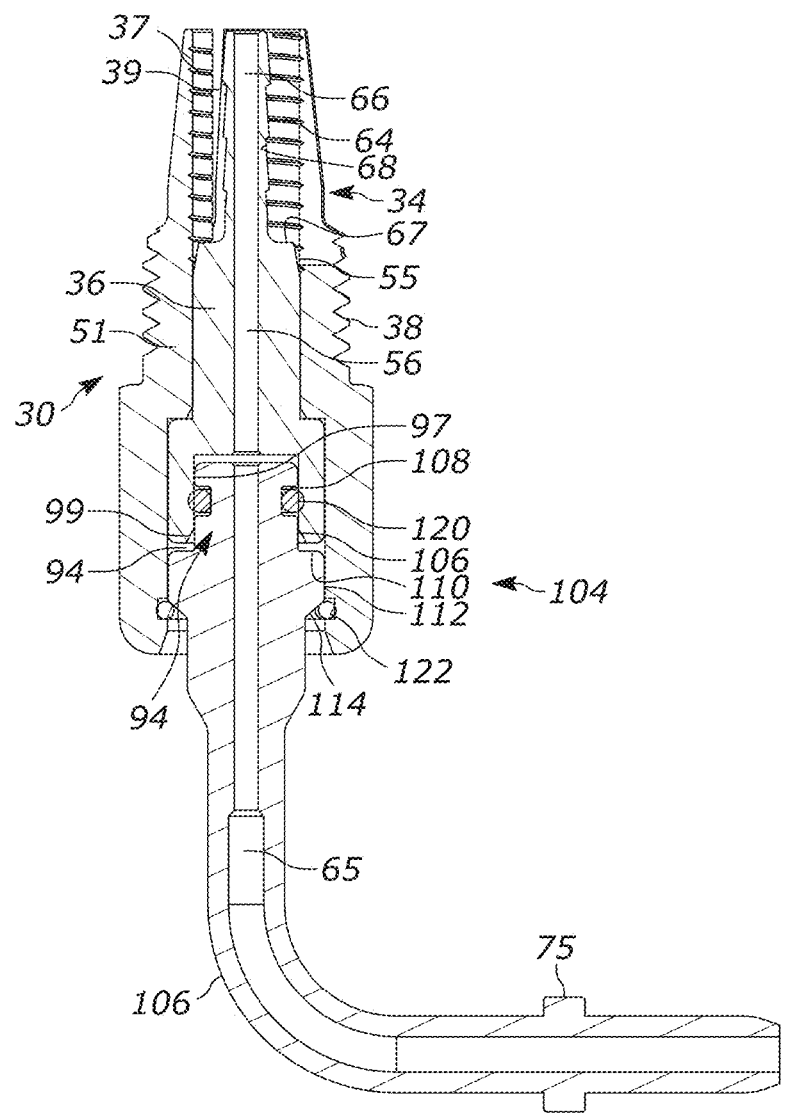
FIG. 6 of the drawings is a cross-sectional view of the pivotable hose connector of the present disclosure, with the clamping nut removed.

With reference to FIGS. 1-6 and 13, to assemble a pivotable hose connector, first, the components are provided. Once provided, the connector housing 12 and the hose insertion member 14 are attached together. In the configuration shown, the hose insertion member 14 is inserted into the internal bore portion 28 and press fit there into. More specifically, the hose insertion member id directed into the lower housing cavity. Eventually, the flange 90 approaches and contacts the upper flange 83 so as to preclude further insertion of the hose insertion member into the bore of the connector housing 12. As can be seen in FIG. 5, once fully seated, the hose barb 42 generally corresponds to the crimp sleeve portion 22 of connector housing 12.

Next, the attachment assembly tubular coupling assembly 63 can be prepared for attachment to the connector housing 12 and the hose insertion member 14. Specifically, the seal member 120 is positioned in the annular channel 108 of the hose insertion member coupling 102. Subsequently, the hose insertion member coupling 102 is inserted into the inner cavity 94 of the second side region 52 of the hose insertion member 14. The seal member 120 engages with the seal surface 97 of the second side region so as to form a seal between the hose insertion member coupling 102 and the second side region 52. Continued insertion slidably moves the seal along the seal surface 97. Advantageously, the seal surface 97 extends substantially the entirety of the lower second side region 52 such that inward and outward movement of the tubular coupling assembly 63 can be facilitated while the seal is maintained therebetween.

Eventually, the insertion of the tubular coupling assembly 63 is sufficient so as to direct the lower locking surface 114 of the connector housing coupling 104 beyond the locking annular groove 88 of the lower housing cavity 80. With the locking annular groove 88 exposed, the locking member 122 (i.e., circlip), can be inserted into the locking annular groove 88. The locking member 122 extends outside of the locking annular groove 88 and interfaces with the lower locking surface 114, which precludes the connector housing coupling 104 from backing out of the lower housing cavity 80. Due to the cylindrical configuration of the components (i.e., generally circular structures of the lower housing cavity 80, the outer surface 106 and the outer surface 112, and, generally concentric with each other), the tubular coupling assembly 63 can be rotated relative to the hose insertion member 14 and the connector housing 12. In the configuration shown, the tubular coupling assembly 63 can be fully rotated through 360° of rotation. In some configurations, the rotation may be limited to less than 360° of rotation. At the same time, the relationship (i.e., clearance) between the outer surface 112 of the connector housing coupling 104 and the lower housing cavity 80 of the connector housing 12 limit side to side movement of the tubular coupling assembly 63 relative to the connector housing 12. It is contemplated that in other configurations, the lower housing cavity of the connector housing can be omitted and the seal member 120 can engage directly with the lower housing cavity 80 of the connector housing 12.

Figure 12:
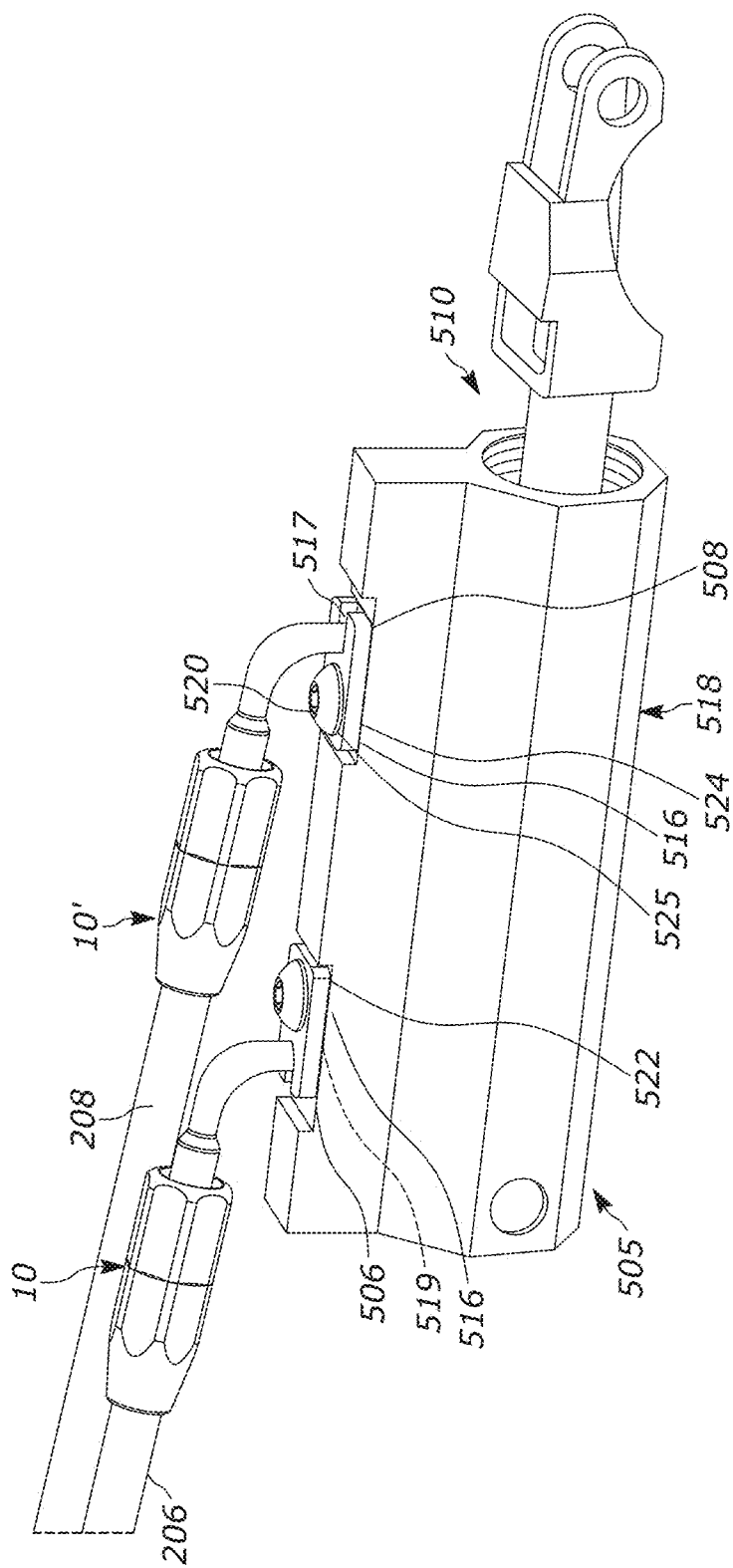
FIG. 12 of the drawings is a perspective view of a hydraulic cylinder having a plurality of pivotable hose connectors attached to respective hoses and to the hydraulic cylinder, and FIG. 13 of the drawings is an exploded view of the pivotable hose connector of the present disclosure.
Figure 13:
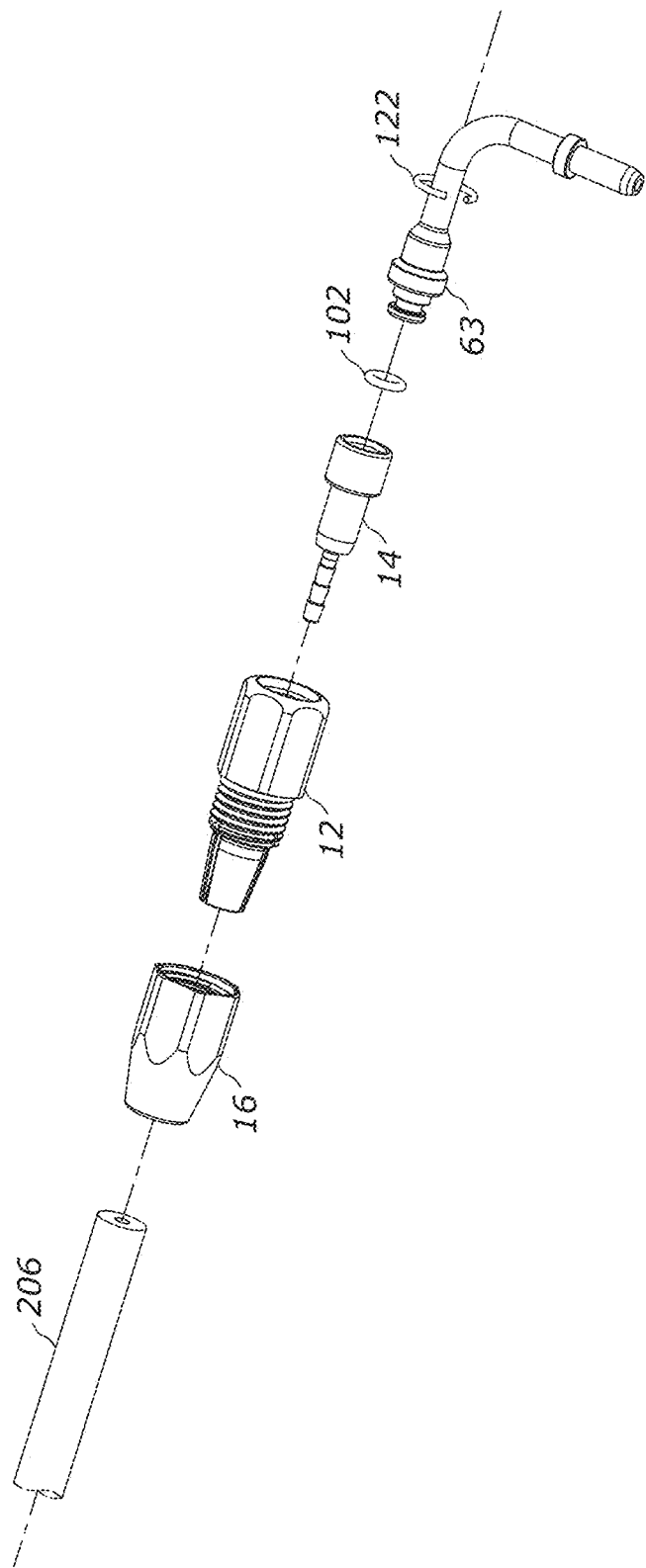

The assembly of the pivotable convertible housing connector to an existing rebuilt cylinder, FIG. 12 illustrates a detailed view of the remanufactured convertible top hydraulic cylinder 505. In this example, the remanufactured convertible top hydraulic cylinder 505 is shown as including two (2) of the convertible hose connector assemblies 10, 10'. Typically, a hydraulic cylinder receives pressurized hydraulic fluid through one of the ports 506, 508 to push a rod 510 in either one of a first or a second direction within a cylinder. It is understood that the remanufactured convertible top hydraulic cylinder 505 can include two of the convertible hose connector assemblies 10, 10', or even one convertible hose connector assembly 10 and one convertible hose connector assembly 10'. Thus, either of the convertible hose connector assembly 10 and the convertible hose connector assembly 10' can be attached to either of the hydraulic hoses 206, 208.

The remanufactured convertible top hydraulic cylinder 505 can further include clips 516 to secure, such as with screws (or other fasteners) 520, the two the convertible hose connector assemblies 10, 10' to a body 518 of the remanufactured convertible top hydraulic cylinder 505. In such a configuration, to remanufacture a cylinder, the hydraulic cylinder may be provided with slots 522, 524 which can be formed (i.e., machined in one configuration) into the body 518 proximate the ports 506, 508. The clips 516 are configured to fit within the slots 522, 524 and each include a fork portion 517 which allows for the tubular coupling assembly to extend therethrough. The fork portion 517 is sized so as to permit placement of the tubular coupling assembly therein, while precluding passage of the retention collar therebeyond.

The clips 516 further include openings which correspond to the bores 519, and, the bores 519 may be threaded. Fasteners 520 can be threaded through the openings 525 and into the respective bores so as to clamp the clips 516 therebetween while capturing the retention collar along with the tubular coupling assembly within the respective one of the ports 506, 508. With the configuration shown, the two (2) the convertible hose connector assemblies 10, 10' are able to swivel left and right once coupled to the body 518, while being precluded from removal from within the respective ports 506, 508. In other configurations, the clips may extend over the body without being in slots, and the clips may be coupled unitized (that is joined together) and attached to the body through other structures, such as adhesion, interference fit, riveting, bolting or otherwise.

In instances where replacement of the convertible top hydraulic cylinder 505 is necessitated (i.e., the hydraulic cylinder leaks, hose couplers leak, or has otherwise failed), a hydraulic cylinder having the pivotable hose connector assemblies 10, 10' can be utilized. Specifically, the hoses going to the leaking hydraulic cylinder can be cut (for example, and without limitation, adjacent to the factory fitting) and the leaking hydraulic cylinder can be removed. Preferably, the hose is cut adjacent to the factory fitting so as to preserve hose length to the extent possible. The cylinder can be remanufactured and reassembled with the pivotable hose connector assemblies 10, 10', or it may be replaced with another remanufactured unit.

The coupling will be described with respect to one of the pivotable hose connectors, the understanding that other pivotable hose connectors can be attached in the same manner. Specifically, with the clamping nut being loose to an extent sufficient to allow for the insertion of the hose into the crimp sleeve portion of the connector housing 12, the hose is directed beyond the opening of the clamping nut 16 and between the crimp sleeve portion 22 and the hose barb 42. Preferably, the inner diameter is elastically deformed by the hose barb 42 upon insertion so as to promote a seal therebetween. It is preferred that the hose is inserted until the end of the hose reaches the flange 67.

Once inserted sufficiently, the clamping nut is tightened through the threaded engagement between the threaded portion 77 with the threaded region 38. As the clamping nut 16 is tightened (i.e., directed toward the central body through rotation), the smooth bore portion 79 of the clamping nut presses against the outer surface 34 of the crimp sleeve portion 22 directing the same inwardly. Due to the different relief slots 39, portions of the outer surface 34 are deflected inwardly toward and into contact with the outer surface of the hoses 106, 108. Continued rotation tightens the clamping nut 16 and further inwardly directs the crimp sleeve portion 22 against the surface of the hydraulic hoses 106, 108, thereby sandwiching the hydraulic hoses 106, 108 between the hose barb 42 on the inside and the internal bore 36 of the crimp sleeve portion 22. The cooperation of the surface pattern 37 of the internal bore 36 and the pattern 68 of the hose barb 42 provides additional seal strength so as to make a fluid tight connection. Preferably, the clamping nut 16 is further tightened until the inner end 72 of the clamping nut 16 reaches the first side 24 of the first end body portion 20. In other configurations, the clamping nut 16 may be tightened to a particular torque instead of being directed into contact with the first end body portion 20.

In many instances, once the hoses have been attached to the hydraulic cylinder and the hydraulic cylinder is to be attached to the vehicle, excessive stress can be directed upon the hoses and/or the couplings. In many instances, the tightened configuration is such that there is an undesirable condition that results in the components due to the angle of the components. In other instances, where the hydraulic cylinder is first coupled to the car and then the hoses are coupled to the hydraulic cylinder, there are instances wherein the angles and the positions of the components renders the grasping and manipulating of the components with wrenches difficult. And, in some instances, the integrity of a fixed or non-pivotable convertible cylinder hose connector can be compromised. With the pivotable hose connector 10, once coupled to the hydraulic cylinder, connector housing 12 can be rotated relative to the tubular coupling assembly 63 so as to orient the either one of the connector housing and/or the clamping nut in a configuration wherein attachment of wrenches can be achieved. Additionally, the relative rotation between the connector housing 12 and the tubular coupling assembly 63 is further advantageous as the clamping nut is tightened and loosened, whereas with non-pivotable connectors, leaks and degradation of the hose can occur.

Once completed, the air can be bled from the system, and replaced with hydraulic fluid. The use of the two hose connector assemblies provides the remanufactured convertible top hydraulic cylinder 505 with the ability to take advantage of existing hoses that are already installed, thereby not requiring the extensive removal process. It will be understood that the convertible hose connector assembly 10, 10' of the present disclosure is configured to withstand large pressures of the type that would be found on such hydraulic equipment which is generally utilized for the operation of convertible tops. Through testing, such a hose connector assembly maintains a leak proof configuration at pressures in the area of 10,000 psi. Of course, this is merely exemplary, and the disclosure is not limited to use in association with such a pressure or pressures near or approximate to such a pressure.

The present disclosure has advantages. For example, it is known that splices are strategically placed so that they have adequate space around them and so that they do not interfere with other components. As will be understood the positioning can vary from one application to another. For this reason, in many applications, replacing the factory cylinder hose connector fitting with the pivotable hose connector of the present disclosure can eliminate the concern for proper splice positioning. Specifically, the hoses attached to the leaking hydraulic cylinder can be cut adjacent to the factory fitting and the leaking hydraulic cylinder can be removed. Because the hose is cut adjacent to the factory fitting, the hose remains installed in the vehicle and the hose length can be preserved. Another advantage for the pivotable cylinder hose connector fitting is that because the hoses are cut adjacent to the factory fittings and remain in the vehicle, some cylinder types can now be shared between several makes and models. Examples are 1999 Mercedes-Benz model SLK 230, 2004 Mercedes-Benz SL500 and 2007 Mercedes-Benz SLK 350 front latch actuation cylinders. In these vehicles, except for the hose lengths, the cylinders are the same. Because the hoses remain in the particular vehicle with their length preserved, a rebuild cylinder with pivotable connectors can allow the installer to use the cylinder more universally.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A pivotable hose connector comprising:
   a connector housing having a crimp sleeve portion having a threaded outer surface and a lower housing cavity;
   an attachment assembly including:
      a hose insertion member having a hose barb and a central bore extending therethrough, the hose insertion member being positioned within the connector housing so that the crimp sleeve portion surrounds the hose barb, and a body end being positioned within the lower housing cavity; and
      a tubular coupling assembly extendable into the lower housing cavity, the tubular coupling assembly being in rotative engagement relative to each of the connector housing and the hose insertion member and sealed with the hose insertion member, the tubular coupling assembly further including a tubular extension having an internal bore portion in fluid communication with the central bore; and
   a clamping nut threadedly engageable with the threaded outer surface, and including a bore extending therethrough that corresponds to the central bore.

2. The pivotable hose connector of claim 1 wherein:
   the hose insertion member further includes a depending wall defining an inner cavity, the inner cavity in fluid communication with the central bore; and
   the tubular coupling assembly further includes a hose insertion member coupling insertable into the inner cavity, with a seal member extending between the inner cavity and the hose insertion member coupling.

3. The pivotable hose connector of claim 2 wherein the hose insertion member coupling further includes an annular channel, and the seal member comprises an O-ring insertable into the annular channel.

4. The pivotable hose connector of claim 3 wherein the hose insertion member coupling is slidably movable relative to the inner cavity while maintaining sealed engagement.

5. The pivotable hose connector of claim 3 wherein the tubular coupling assembly further includes a connector housing coupling positioned between the hose insertion member and the tubular extension, and a locking member engaging the lower housing cavity of the connector housing and the connector housing coupling to preclude removal of the hose insertion member coupling from the lower housing cavity of the connector housing.

6. The pivotable hose connector of claim 5 wherein the locking member is disposed within a locking annular groove formed into the lower housing cavity, and the locking member comprises a circlip.

7. The pivotable hose connector of claim 5 wherein a lower locking surface is inwardly tapered.

8. The pivotable hose connector of claim 2 wherein the connector housing further includes an upper flange defined in the lower housing cavity, with the hose insertion member further including a flange, the upper flange abutting the flange when the hose insertion member is fully seated within the connector housing.

9. The pivotable hose connector of claim 3 wherein the connector housing coupling further includes an outer surface rotatably interfaceable with the lower housing cavity in a spaced apart configuration.

10. The pivotable hose connector of claim 3 wherein the outer surface interfaces with the lower housing cavity to preclude a side to side movement, while facilitating rotative movement.

11. The pivotable hose connector of claim 1 wherein the hose insertion member is in press fit engagement within the crimp sleeve portion of the connector housing.

12. The pivotable hose connector of claim 1 wherein the tubular coupling assembly remains in rotative sealed engagement through a full rotation of the tubular coupling assembly relative to each of the connector housing and the hose insertion member.

13. The pivotable hose connector of claim 1 wherein the clamping nut includes an outer surface that is structurally configured to receive a wrench, and the connector housing includes an outer surface that is structurally configured to receive a second wrench, wherein the clamping nut and the connector housing are configured so that the wrench and the second wrench can be the same.

14. The pivotable hose connector of claim 1 wherein the crimp sleeve portion and the hose barb are structurally configured to compress a hose therebetween, when the clamping nut is threadedly engaged with the threaded outer surface of the crimp sleeve portion.

15. The pivotable hose connector of claim 14 wherein the hose has an inner bore diameter of approximately 1.5 mm to 2.5 mm.

16. A hydraulic cylinder having at least one pivotable hose connector of claim 1 coupled thereto.

17. The hydraulic cylinder of claim 16 wherein the tubular coupling assembly is attached to the hydraulic cylinder.

18. The hydraulic cylinder of claim 16 wherein the hydraulic cylinder has at least two pivotable hose connectors coupled thereto.

19. A pivotable hose connector comprising:
   a connector housing having a crimp sleeve portion having a threaded outer surface and a lower housing cavity;
   an attachment assembly including:
      a hose insertion member having a hose barb and a central bore extending therethrough, the hose insertion member being positioned within the connector housing so that the crimp sleeve portion surrounds the hose barb, and the body end being positioned within the lower housing cavity, the hose insertion member further includes a depending wall defining an inner cavity, the inner cavity in fluid communication with the central bore; and
      a tubular coupling assembly in rotative engagement relative to each of the connector housing and the hose insertion member and in sealed with the hose insertion member, the tubular coupling assembly further including a tubular extension having an internal bore portion in sealed fluid communication with the central bore, and a hose insertion member coupling insertable into the inner cavity, with a seal member extending between the inner cavity and the hose insertion member coupling; and
   a clamping nut threadedly engageable with the outer surface, and including a bore extending therethrough that corresponds to the central bore.

20. A method of using the pivotable hose connector of claim 1 comprising the steps of:
 extending a hose between the hose barb and the crimp sleeve portion;
 tightening the clamping nut onto the connector housing;
 rotating the tubular coupling assembly relative to the connector housing at least one of prior to or after the step of tightening the clamping nut.

21. The method of claim 20 wherein the method further includes the step of coupling the pivotable hose connector to a hydraulic cylinder.

\* \* \* \* \*